(12) United States Patent
Browall et al.

(10) Patent No.: US 6,290,180 B1
(45) Date of Patent: Sep. 18, 2001

(54) PHOTOCATALYTIC COATINGS ON OPTICAL SOLAR REFLECTORS TO DECOMPOSE ORGANIC CONTAMINANTS

(75) Inventors: Kenneth W. Browall; Chang Wei, both of Niskayuna, NY (US)

(73) Assignee: Lockheed Martin Corporation, Sunnyvale, CA (US)

( * ) Notice: Subject to any disclaimer, the term of this patent is extended or adjusted under 35 U.S.C. 154(b) by 0 days.

(21) Appl. No.: 09/392,929

(22) Filed: Sep. 9, 1999

(51) Int. Cl.$^7$ ................................................. B64G 1/52
(52) U.S. Cl. ........................................ 244/158 R; 244/173
(58) Field of Search .................... 244/158 R, 1 R, 244/121; 136/259; 501/45, 47, 48, 73, 79, 904

(56) References Cited

U.S. PATENT DOCUMENTS

| | | | |
|---|---|---|---|
| 4,122,239 | * 10/1978 | Riboulet et al. | 350/96.12 |
| 4,666,760 | 5/1987 | Hasuda et al. | |
| 4,961,994 | * 10/1990 | Cariou et al. | 428/408 |
| 5,373,305 | * 12/1994 | Lepore, Jr. et al. | 343/909 |
| 5,400,986 | 3/1995 | Amore et al. | |
| 5,541,010 | 7/1996 | Tanzilli et al. | |
| 5,616,532 | 4/1997 | Heller et al. | |
| 5,668,066 | * 9/1997 | Oguma et al. | 501/45 |
| 5,688,439 | 11/1997 | Chopin et al. | |
| 5,707,459 | * 1/1998 | Itoyama et al. | 136/259 |
| 5,755,867 | 5/1998 | Chikuni et al. | |
| 5,981,867 | * 11/1999 | Toyama et al. | 136/259 |
| 6,049,419 | * 4/2000 | Wheatly | 359/359 |
| 6,132,881 | * 10/2000 | Hartig et al. | 359/584 |

OTHER PUBLICATIONS

Wen–Yuan Lin et al. "Hexavalent Chromium at Titanium Dioxide in Aqueous Basic Media" J. Electrochem Soc. V.140 No. 9, Sep. 1993.

Marye Anne Fox et al. "Mechanistic Features of the Semiconductor Photocatalyzed Olefin–to–Carbonyl Oxidative Cleavage" J. Am Chem Soc. 1981, 103, 6757–6759.

C.S. Turchi et al. "Mixed Reactant Photocatalysis: Intermediates and Mutual Rate Inhibition" Journal of Catalysis 119, 483–496 (1989).

Hiroshi Yoneyama et al. "Heterogeneous Photocatalytic Reduction of Dichromate on N–Type Semiconductor Catalysts" Nature vol. 282 20/27 Dec. 1979.

Hussain Al–Ekabi et al. "Kinetic Studies in Heterogeneous Photocatalysis" J. Phys. Chem. 1988, 92, 5726–5731.

Andrew Mills et al. "Water Purification by Semiconductor Photocatalysis" Chemical Society Reviews 1993.

David Ollis "Contaminant Degradation in Water" Environ. Sci. Technol., vol. 19, No. 6 1985.

Tadashi Matsunaga et al. "Continous–Sterilization System That Uses Photosemiconductor Powders" Applied and Environmental Microbiology, Jun. 1988, pp. 1330–1333.

* cited by examiner

Primary Examiner—Galen Barefoot
(74) Attorney, Agent, or Firm—Thomas C. Feix; Donald C. Feix

(57) ABSTRACT

An optical solar reflector (OSR) for spacecraft having a thin film layer of photocatalytic coating material applied to the space-facing side of the OSR which is effective to maintain long term effectiveness of optical solar reflectors (OSR) by preventing/decomposing organic residues on the OSR surfaces. Preferred photocatalytic coating materials include photoactive transition metal oxides and compound semiconductor materials. The photoactive coating material is excited by the UV or near UV components of solar radiation to generate free carriers. The resulting conduction-band electrons and valence-band holes can then interact with bound oxygen in the organic residues to form radicals and eventually break down the organic contaminants.

14 Claims, 5 Drawing Sheets

PHOTOCATALYTIC COATINGS ON OPTICAL SOLAR REFLECTORS TO DECOMPOSE ORGANIC CONTAMINANTS

TECHNICAL FIELD

The present invention relates to techniques for improving the long term stability of optical solar reflectors. More particularly, this invention relates to photocatalytic coating compositions for applying to optical solar reflectors to prevent/decompose organic residues on the reflector surfaces.

BACKGROUND OF THE INVENTION

An optical solar reflector (OSR) is a second-surface reflector on a transparent substrate, which is attached to the outer surfaces of a spacecraft for (1) reflecting solar energy incident on the spacecraft (reflection), and (2) radiating heat energy produced in the spacecraft (emission). The desired function of optical solar reflectors on satellites is to minimize thermal variations in sensitive satellite electronics caused by the electronic themselves and by solar radiation, which cause detrimental effects on phase array device operation. Thus, one of the requirements for OSR materials is to have low /E ratio ( : absorption coefficient; E: emissivity).

Currently, indium-tin oxide (ITO) coated glass in conjunction with a silver layer is used as the preferred OSR tile material. Unfortunately, condensation of thin organic films from non-metallic materials out gassing (e.g., sealants) reduces the optical performance of the OSR, and consequently the thermal control feature. For example, the absorption coefficient of the OSR can increase from 0.1 to 0.4 due to the formation of contaminant films, usually 10–100 nm in thickness, over a period of years. Thus, it is critical to overcome this contamination problem in order to maintain the long term effectiveness of the OSR. The invention described herein involves the application of a thin semiconductor coating (e.g., $TiO_2$) to promote decomposition of organic contaminants based on photocatalytic principles.

It is known that photo assisted heterogeneous catalysis can destroy hydrocarbon and chlorocarbon contaminants in water. See, for example, the following references: D. F. Ollis, "Contaminant degradation in water", Environ. Sci. Technol., 1985, Vol. 19, No. 6, pp 480–484; C. S. Turchi and D. F. Ollis, "Mixed Reactant Photocatalysis: Intermediates and Mutual Rate Inhibition", Journal of Catalysis, 1989, 199, pp 483–496; A. E. Hussain and N. Serpone, "Kinetic Studies in Heterogeneous Photocatalysis. 1. Photocatalytic Degradation of Chlorinated Phenols in Aerated Aqueous Solutions over $TiO_2$ Supported on a Glass Matrix", J. Phys. Chem., 1988, 92, pp 5726–5731; and M. A. Fox and C. C. Chen, "Mechanistic Features of the Semiconductor Photocatalyzed Olefin-to-Carbonyl Oxidative Cleavage", J. Am. Chem. Soc., 1981, 103, pp 6757–6759. This process is achieved by illuminating a semiconductor catalyst, typically titanium dioxide ($TiO_2$), with greater-than-bandgap ultraviolet or near ultraviolet light in order to create electron excitation within the solid. Electron-hole pairs generated by the photoexcitation can then react with water or oxygen to lead to the formation of hydroxyl and other oxygen-containing free radicals. These radicals may attack and oxidize organics.

For hydrocarbon compounds, the primary decomposition products are often carbon dioxide and water. One of the advantages of $TiO_2$ as a photocatalyst is its chemical stability and strong oxidizing/reducing power. In fact, $TiO_2$ has been extensively used for organic decomposition in aqueous systems based on photocatalytic principles (see the four references noted above). $TiO_2$ has also been used for heavy metal removal in aqueous systems based on photocatalytic principles. See, for example, H. Yoneyama et al., "Heterogeneous photocatalytic reduction of dichromate on n-type semiconductor catalysts", Nature, 1979, Vol. 282, pp 817–818; and W. Lin et al., "Hexavalent Chromium at Titanium Dioxide in Aqueous Basic Media", J. Electrochem. Soc., September 1993, Vol. 140, No. 9, pp 2477–2482. In addition, $TiO_2$ has been used for bacteria killing in aqueous systems based on photocatalytic principles. See, for example, T. Matsunaga et al., "continuous-Sterilization System That Uses Photosemiconductor Powders", Appl. Environ. Microbiol., 1988, Vol. 54, pp 1330–1333.

To our knowledge, there are no applications which teach or suggest the use of photoactive semiconductor materials like $TiO_2$ to decompose organic residues under vacuum conditions, for example Space, where there is little or no oxygen. The invention described herein is directed to photocatalytic coatings for preventing formation of and/or decomposing organic residue formed at the OSR surface under space conditions.

SUMMARY OF THE INVENTION

The objective of this invention is to maintain long term stability of optical solar reflectors (OSR) by applying photocatalytic coatings to prevent/decompose organic residues on the OSR surfaces.

In accordance with the present invention, a thin film layer of photoactive semiconductor material is deposited or otherwise applied onto the OSR surface in order to photodecompose organic contaminants that tend to form on the OSR surfaces as a result from out gassing of organic materials (e.g., sealants). In use, the applied photoactive semiconductor material is excited by the UV or near UV components of solar radiation to generate free carriers. The resulting conduction-band electrons and valence-band holes can then interact with bound oxygen in the organic residues to form radicals and eventually break down the organic contaminants.

In accordance with an important aspect of the invention, the selected coating material should be sufficiently thin so that the optical properties of OSR are not affected.

Methods and apparatus which incorporate the features described above and which are effective to function as described above constitute specific objects of this invention.

Other and furrther objects of the present invention will be apparent from the following description and claims and are illustrated in the accompanying drawings, which by way of illustration, show preferred embodiments of the present invention and the principles thereof and what are now considered to be the best modes contemplated for applying these principles. Other embodiments of the invention embodying the same or equivalent principles may be used and structural changes may be made as desired by those skilled in the art without departing from the present invention and the purview of the appended claims.

BRIEF DESCRIPTION OF THE DRAWING VIEWS

DETAILED DESCRIPTION OF THE PREFERRED EMBODIMENTS

Figure 1:
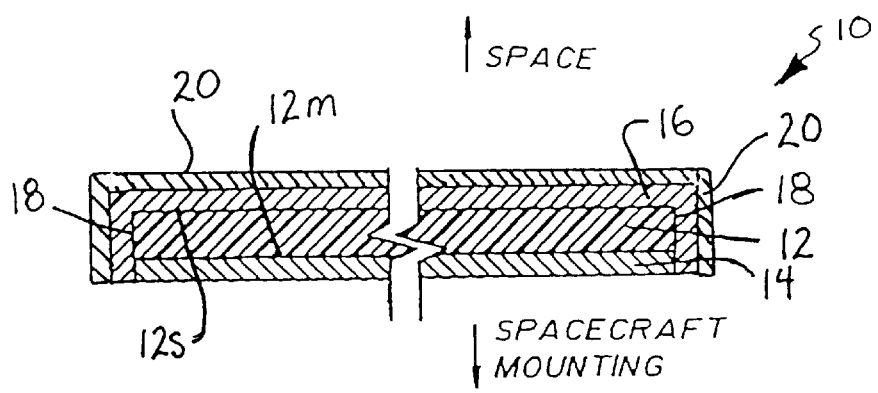
FIG. 1 is cross-section view through a typical optical solar reflector (OSR) tile which includes a photocatalytic coating in accordance with the present invention.

FIG. 1 is a cross-section through an improved optical solar reflector (OSR) tile 10 in accordance with the present invention.

In the preferred embodiment, the OSR tile 10 is of conventional manufacture and includes a substrate 12 (e.g., glass, quartz, or silicon nitride) having a reflective coating 14 (e.g., a silver coating) affixed to its space craft mounting side 12m. A layer 16 of transparent, electrically conductive material (e.g., indium oxide or indium-tin oxide) is coated onto its space-facing side 12s, and laps onto the edges 18 of the tile and is in electrical contact with the reflective coating 14.

In accordance with the present invention, a coating layer 20 of oxidation material is applied as an outermost layer onto the space-facing side 12s and side edges of the tile and overlies layer 16. Oxidation coating layer 20 is effective to facilitate removal of organic residues that tend to accumulate on the OSR surfaces over time. In a preferred embodiment, the oxidation material is photocatalytic. A photocatalyst useful in the invention is a semiconductor material selected from the group consisting of photoactive transition metal oxides, including, but not limited to $TiO_2$, ZnO, $WO_3$, $CaTiO_3$, $SnO_2$, $CaTiO_3$, $MoO_3$, $NbO_5$, $Fe_2O_3$, $Ta_2O_5$, and $Ti_x(Zr_{1-x})O_2$, where X has a value of between 0 and 1. Preferred photocatalysts are TiO2, ZnO, and WO3. Compound semiconductors, including, but not limited to ZnS, ZnSe, and CdS are also useful photocatalysts. The coating layer 20 may be applied as a thin film to the space-facing side 12s of the OSR tile 10 using any number of a variety of conventional techniques for forming thin films in the fabrication of integrated circuits, including, but not limited to sputtering, chemical vapor deposition (CVD), plasma enhanced chemical vapor deposition (PECVD), and physical vapor deposition (PVD).

Figure 2:
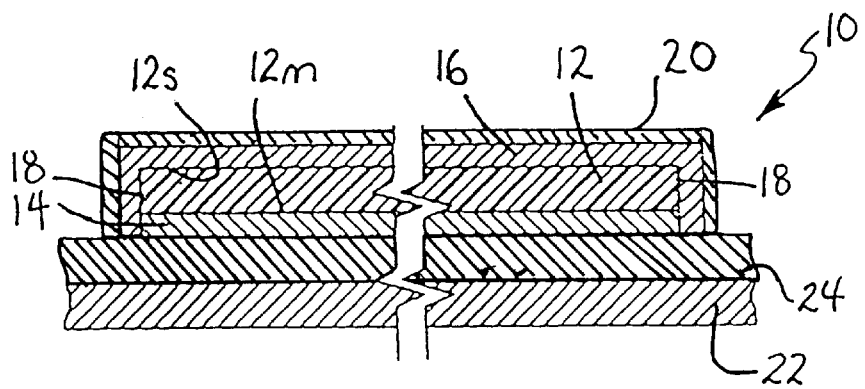
FIG. 2 is cross-section view through an optical solar reflector (OSR) tile as in FIG. 1, mounted to a portion of the outer surface of a spacecraft.

In FIG. 2, the OSR tile 10 is shown mounted to the outer surface of a spacecraft mounting panel 22 by use of adhesive means 24. The adhesive means may comprise a double sided transfer adhesive of the type disclosed in U.S. Pat. No. 5,400,986 or may comprise a suitable liquid resin. Coating layer 20 may also be used in conjunction with other OSR configurations in addition to the embodiment specifically shown and described in FIGS. 1 and 2.

EXAMPLES

The following examples are designed to illustrate certain aspects of the present invention such as the capability of decomposing organic materials via photocatalytic processes utilizing bound oxygen from absorbing residues. The examples are not intended to be comprehensive of all features and all embodiments of the present invention, and should not be construed as kimiting the claims presented herein.

Example 1

To demonstrate the effectiveness of photocatalyst coatings in preventing organic residues formed on the OSR surfaces, experiments were performed under vacuum condition to simulate space environments, and a thermal quartz crystal microbalance (TQCM, sensitivity: 1.56 $ng.Hz^{-1}.cm^{-2}$) was employed to monitor organic contaminant deposition.

Figure 3:
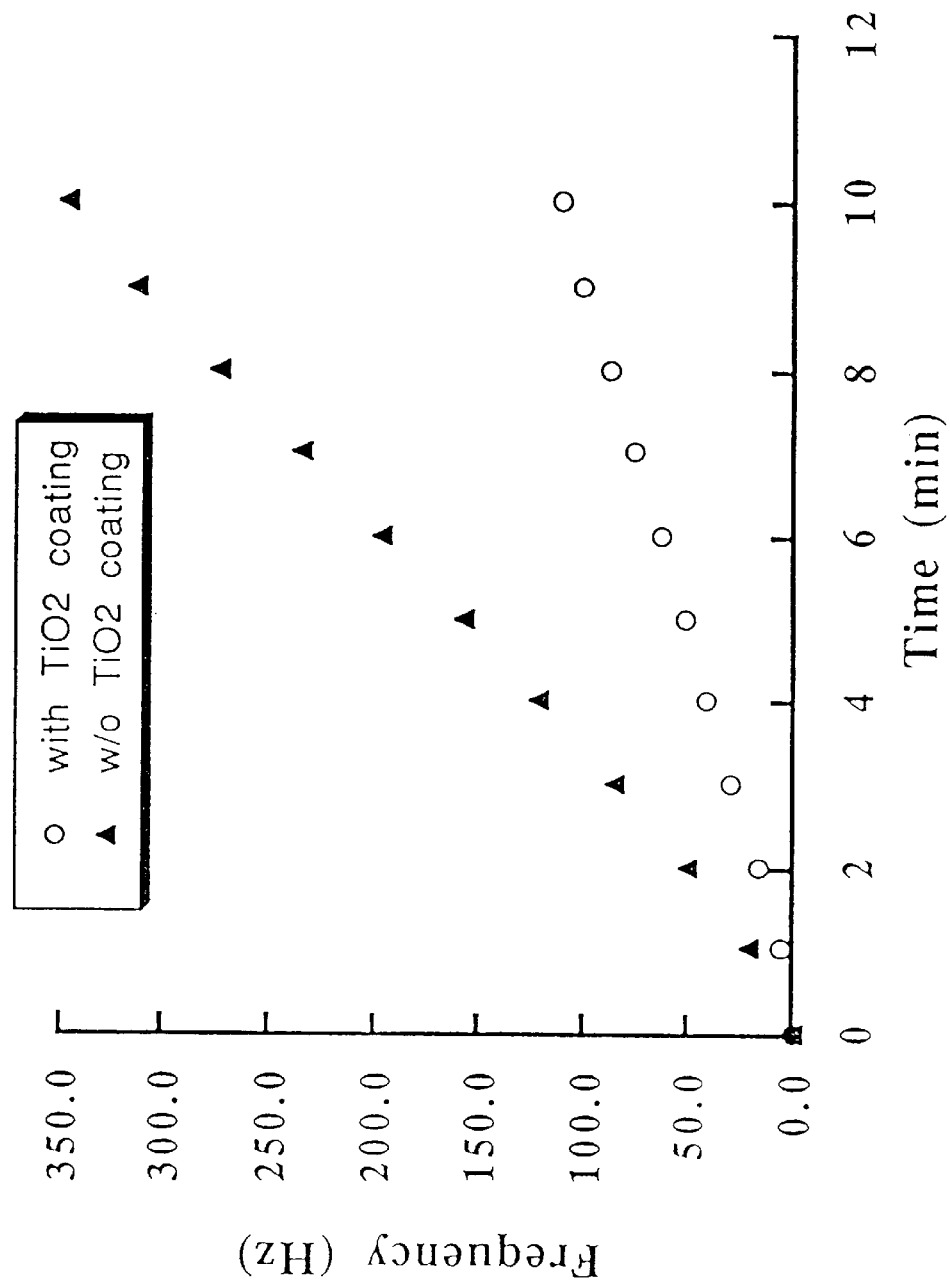
FIG. 3 is a graph showing frequency change (mass change) as a function of time under UV radiation illustrating the deposition rates of organic contaminants on a thermal quartz microbalance sensor both with and without a $TiO_2$ coating.
Figure 4:
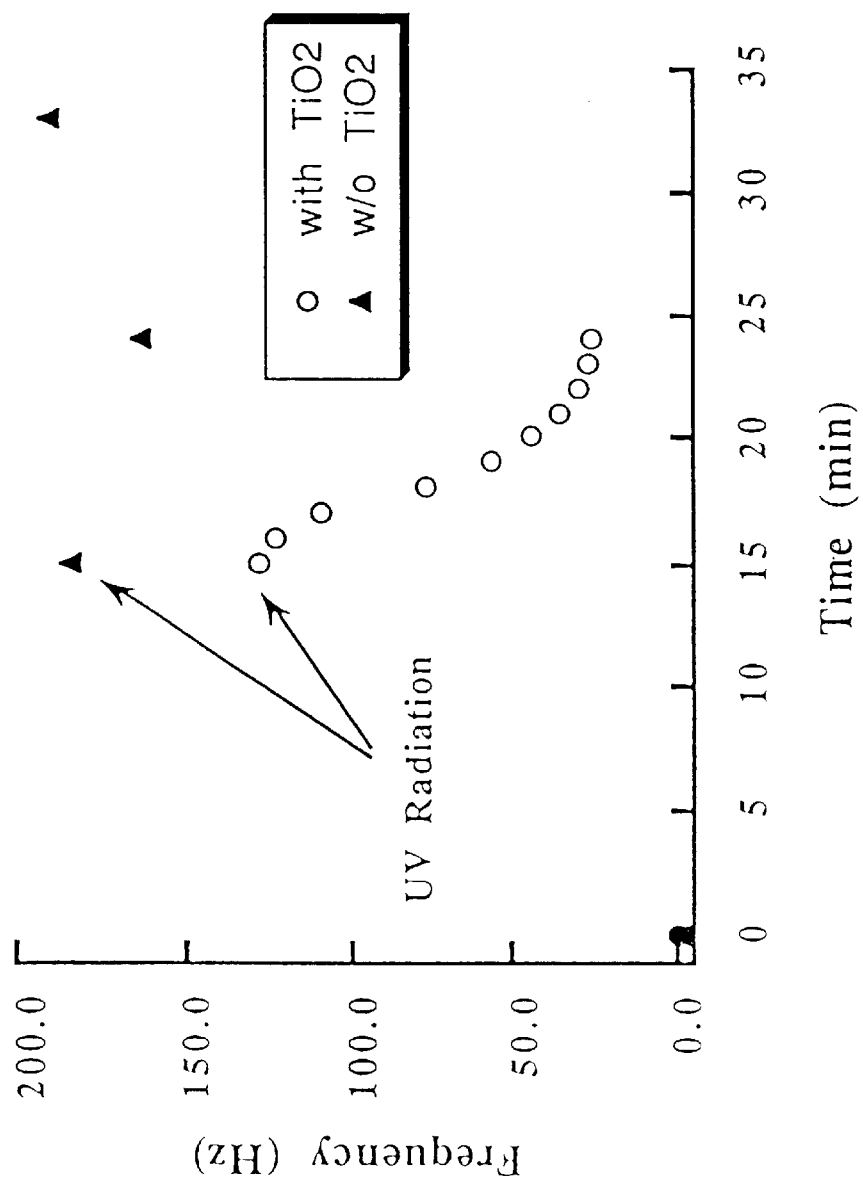
FIG. 4 is a graph showing frequency change (mass change) as a function of time for a pre-deposited film with UV radiation.

In this first example, a thin layer $TiO_2$ (photocatalyst, 2~40 nm) was coated on a TQCM surface, and organic contaminants were then deposited on the TQCM sensor with or without UV radiation. The deposition rate of the organics was monitored by recording the frequency change (i.e., mass change) of TQCM sensors. FIG. 3 shows typical TQCM results. As seen in FIG. 3, the rate of organics deposition on $TiO_2$-coated surface was significantly lower compared to that at the plain TQCM surface under UV radiation. These results suggested that $TiO_2$ coatings are effective in preventing organic residues, which are further supported by the fact that a significant increase in deposition rate was observed when no UV radiation was applied. In addition, the experiments also demonstrated that pre-deposited organic films on $TiO_2$ surfaces can be partially removed under UV illumination (FIG. 4). In this case, frequency decrease at the $TiO_2$-coated TQCM sensor with a thin organic film was observed upon UV radiation, which indicated the removal of such materials. On the other hand, significantly less change in frequency was seen for a plain TQCM (no $TiO_2$ coating) sensor under similar conditions. To investigate the effect of $TiO_2$ coating on the optical properties of the OSR, the absorption coefficient was measured as a function of $TiO_2$ thickness. The results showed that essentially no change was observed on OSRs with such a thin $TiO_2$ coating. In summary, the test data obtained clearly indicates that $TiO_2$ coating is effective.

Example 2

Figure 5:
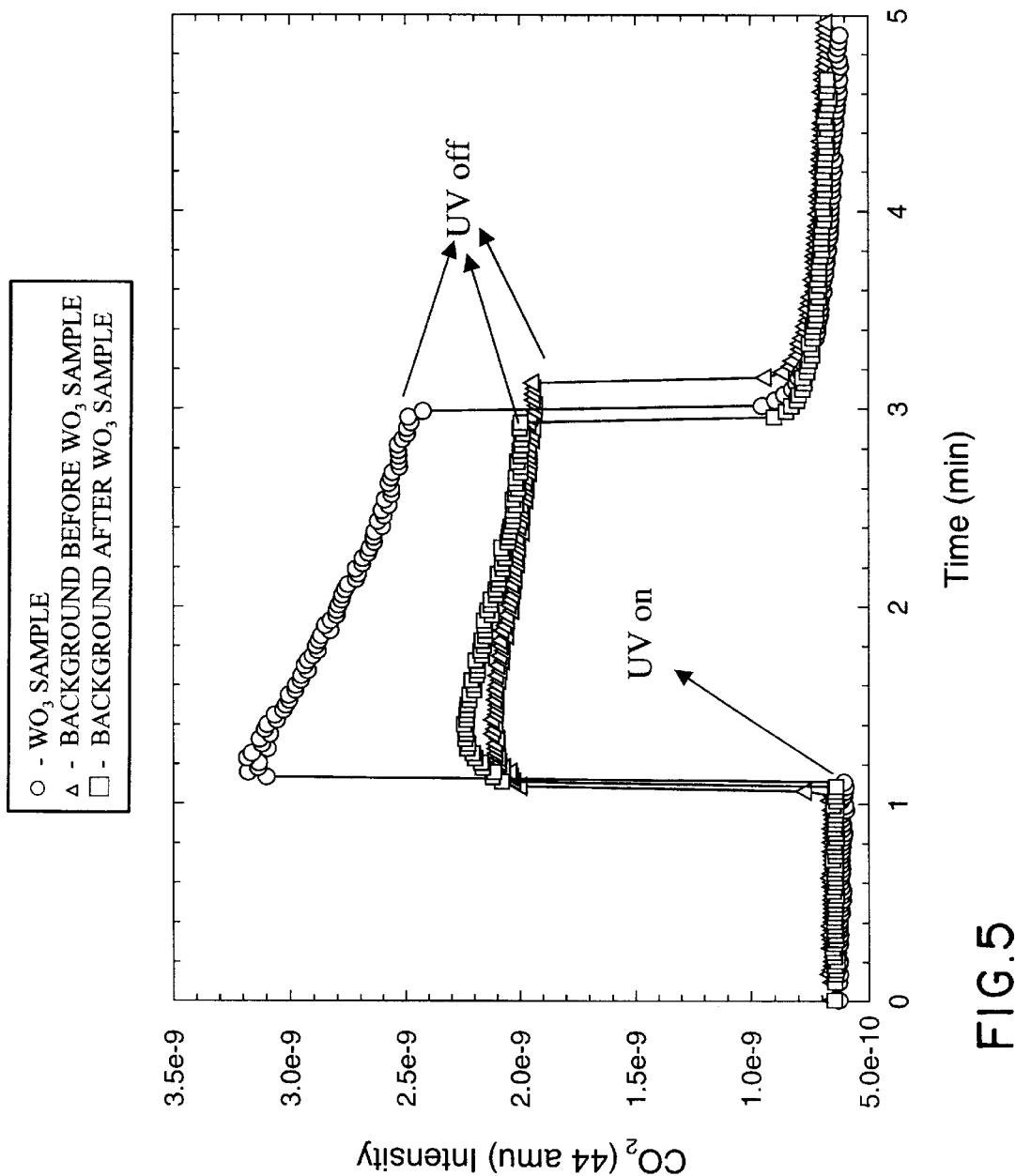
FIG. 5 is a graph showing $CO_2$ response as a function of UV radiation time illustrating the photocatalytical effectiveness of $WO_3$ in preventing and/or removing organics under vacuum conditions.

In this example, a thin layer of $WO_3$ (i.e., less than 200 nm in thickness) was coated on a quartz substrate, and organic contaminates (dioctyl phthalate) were then pre-deposited on the $WO_3$ surface. The test sample was then placed in an ultrahigh vacuum chamber (UHV, $10^{-10}$~$10^{-11}$ torr) and radiated with UV light. Mass spectrometry was used to detect potential decomposition products of the organic contaminants. For photocatalytic processes, one of the decomposition products is carbon dioxide ($CO_2$). The graph of FIG. 5 shows $CO_2$ response as a function of UV radiation time. Here, the circles denote a $WO_3$ sample exposed to UV radiation at $9 \times 10^{-10}$ torr. The triangles denote background condition (no sample) before $WO_3$ UV exposure. The squares denote background condition (no sample) after $WO_3$ UV exposure. As is seen in FIG. 5, a significant increase in $CO_2$ signal was observed compared to the background signal when the test sample was exposed to UV radiation. This demonstrates the occurrence of photocatalytic processes at the surface. The results revealed that $WO_3$ is photocatalytically effective in preventing and/or removing organics under vacuum conditions.

Example 3

Figure 6:
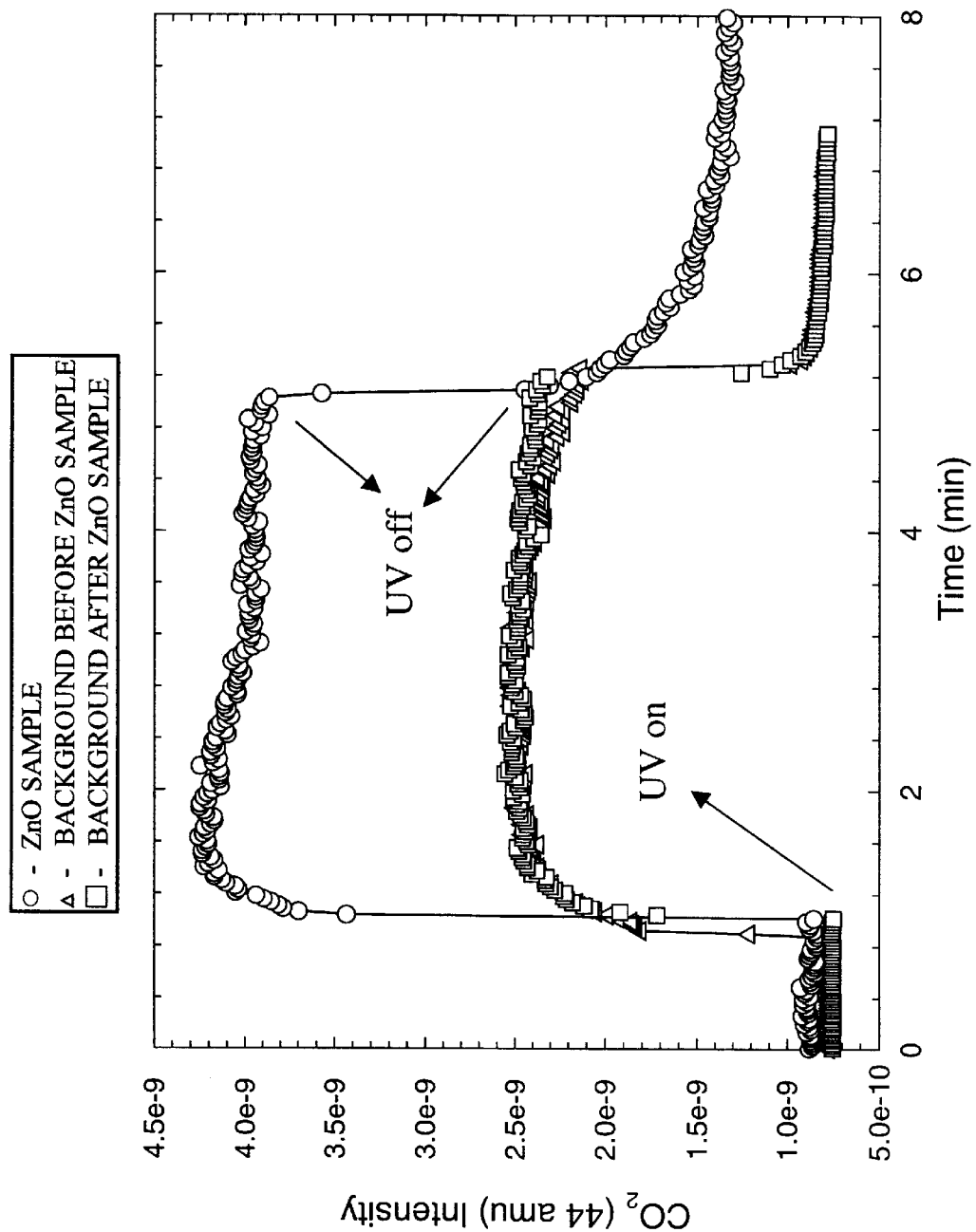
FIG. 6 is a graph showing $CO_2$ response as a function of UV radiation time illustrating the photocatalytical effectiveness of ZnO in preventing and/or removing organics under vacuum conditions.

In this example, a thin layer of ZnO (i.e., less than 200 nm in thickness) was coated on a quartz substrate, and organic contaminates (dioctyl phthalate) were then pre-deposited on the ZnO surface. The sample was then placed in an ultrahigh vacuum chamber (UHV, $10^{-10}$~$10^{-11}$ torr) and radiated with UV light. Mass spectrometry was used to detect potential decomposition products of the organic contaminants. For photocatalytic processes, one of the decomposition products is carbon dioxide ($CO_2$). FIG. 6 shows $CO_2$ response as a function of UV radiation time. Here, the circles denote a ZnO sample exposed to UV radiation at $8 \times 10^{-10}$ torr. The triangles denote background condition (no sample) before ZnO UV exposure. The squares denote background condition (no sample) after ZnO UV exposure. As is seen in FIG. 6, significant increase in $CO_2$ signal was observed compared to the background signal when the sample was exposed to UV radiation. This demonstrates the occurrence of photocatalytic processes at the surface. The results revealed that ZnO is photocatalytically effective in preventing and/or removing organics under vacuum conditions.

The above examples clearly indicate that other photoactive semiconductor materials, including but not limited to $CaTiO_3$, $SnO_2$, $CaTiO_3$, $MoO_3$, $NbO_5$, $Fe_2O_3$, $Ta_2O_5$, $Ti_x(Zr_{1-x})O_2$, where X has a value of between 0 and 1, and SiC, should prove effective in removing and/or decomposing organic materials from the OSR surface under vacuum conditions (e.g., space environment). As noted above, the layer thickness of selected thin film semiconductor material should be selected so as not to interfere with the optical properties of the OSR.

While we have illustrated and described the preferred embodiments of our invention, it is to be understood that these are capable of variation and modification, and we therefore do not wish to be limited to the precise details set forth, but desire to avail ourselves of such changes and alterations as fall within the purview of the following claims.

We claim:

1. An optical solar reflector of the kind which is attached to the outer surfaces of a spacecraft and which can have contamination problems produced by the formation of an organic residue on the space-facing surface of the optical solar reflector, said optical solar reflector comprising;

a substrate having a rear, spacecraft-facing surface and a front, space-facing surface;

a reflective layer on said rear, spacecraft-facing surface of said substrate;

a transparent, electrically conductive layer on said front, space-facing surface of said substrate; and a thin film layer of oxidation material applied as a coating to said transparent, electrically conductive layer, said thin film layer of oxidation material being effective in preventing formation of organic contaminants on said solar reflector under the vacuum conditions of space.

2. The optical solar reflector according to claim 1, wherein said thin film layer of oxidation material has a layer thickness within a range of about 2 nm to about 200 nm whereby the layer of oxidation material is thin enough that the optical properties of the optical solar-reflector are not affected.

3. The optical solar reflector according to claim 1, wherein said oxidation material is photocatalytic and is selected from the group of semiconductor materials which include $TiO_2$, ZnO, and $WO_3$.

4. The optical solar reflector according to claim 2, wherein said oxidation material is photocatalytic and is selected from the group of semiconductor materials which include $TiO_2$, ZnO, and $WO_3$.

5. The optical solar reflector according to claim 1, wherein said substrate comprises glass.

6. The optical solar reflector according to claim 1, wherein said substrate comprises quartz.

7. The optical solar reflector according to claim 1, wherein said substrate comprises silicon nitride.

8. An improved optical solar reflector for attachment to outer surfaces of spacecraft, the optical solar reflector including a substrate having a rear, spacecraft-facing surface coated with a reflective layer and a front, space-facing surface coated with a transparent, electrically conductive layer, wherein the improvement comprises:

a thin film layer of oxidation material applied as a coating to said transparent, electrically conductive layer; and said thin film layer of oxidation material being effective in preventing formation of organic contaminants on said solar reflector under the vacuum conditions of space.

9. The improvement according to claim 8, wherein said thin film layer of oxidation material has a layer thickness within a range of about 2 nm to about 200 nm.

10. The improvement according to claim 8, wherein said oxidation material is photocatalytic and is selected from the group of semiconductor materials which include $TiO_2$, ZnO, and $WO_3$.

11. The improvement according to claim 9, wherein said oxidation material is photocatalytic and is selected from the group of semiconductor materials which include $TiO_2$, ZnO, and $WO_3$.

12. A method for controlling the rate of deposition of organic materials on optical solar reflectors of spacecraft to preserve the long term stability of the optical solar reflector, the method comprising:

a) coating an outer surface of the optical solar reflector with a photoactive coating material that under exposure to ultra violet or near ultra violet radiation and in a space environment is capable of removing organic contaminants that typically form on the outer surface of the optical solar reflector as a result of out gassing of organic materials over time; and b) allowing the coated optical solar reflector to be exposed to solar illumination in the space environment such that the photoactive coating material accelerates the removal of the organic contaminants.

13. The method of claim 12, wherein the photoactive coating material is selected from the group of semniconductor materials which include $TiO_2$, ZnO, and $WO_3$.

14. The method of claim 12, wherein the coating material is applied in a layer thickness having a range of about 2 nm to about 200 nm thick.

* * * * *